US012602144B2

(12) United States Patent
Yang et al.

(10) Patent No.: US 12,602,144 B2
(45) Date of Patent: Apr. 14, 2026

(54) SCREEN RECORDING INTERACTION METHOD AND APPARATUS, AND ELECTRONIC DEVICE AND COMPUTER-READABLE STORAGE MEDIUM

(71) Applicant: Beijing Bytedance Network Technology Co., Ltd., Beijing (CN)

(72) Inventors: Can Yang, Beijing (CN); Wenjing Liu, Beijing (CN); Ke Zhong, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 200 days.

(21) Appl. No.: 18/557,745

(22) PCT Filed: Mar. 21, 2022

(86) PCT No.: PCT/CN2022/081912
§ 371 (c)(1),
(2) Date: Oct. 27, 2023

(87) PCT Pub. No.: WO2022/227931
PCT Pub. Date: Nov. 3, 2022

(65) Prior Publication Data
US 2024/0211116 A1      Jun. 27, 2024

(30) Foreign Application Priority Data
Apr. 27, 2021    (CN) .......................... 202110461916.7

(51) Int. Cl.
*G06F 3/0484*          (2022.01)
*G06F 3/0481*          (2022.01)
*G06F 3/14*            (2006.01)

(52) U.S. Cl.
CPC .......... *G06F 3/0484* (2013.01); *G06F 3/0481* (2013.01); *G06F 3/14* (2013.01)

(58) Field of Classification Search
CPC .... G06F 3/0484; G06F 3/0481; G06F 3/0486; G06F 3/14
See application file for complete search history.

(56) References Cited

U.S. PATENT DOCUMENTS

2015/0381896 A1* 12/2015 Park ..................... H04N 23/631
                                                           386/224
2016/0360256 A1* 12/2016 Van Os ................. A63F 13/215
                                  (Continued)

FOREIGN PATENT DOCUMENTS

CN          107957836 A      4/2018
CN          108012182 A      5/2018
                  (Continued)

OTHER PUBLICATIONS

International Search Report and Written Opinion issued May 30, 2022 in International Application No. PCT/CN2022/081912, with English translation (17 pages).
                  (Continued)

*Primary Examiner* — Jeanette J Parker

(57) ABSTRACT

The present disclosure provides a screen recording interaction method, an apparatus, an electronic device and a computer-readable storage medium. The screen recording interaction method includes: displaying a video stream in a display area including a screen recording button; displaying a screen recording component in the display area in response to detecting a trigger signal for the screen recording button, wherein the screen recording component is in a first state, the first state indicating that the video stream is being recorded; and switching the screen recording component from the first state to a second state in response to detecting a trigger signal for the screen recording component, wherein the second state includes displaying an end screen recording
                  (Continued)

button, the end screen recording button being configured to end recording of the video stream.

18 Claims, 6 Drawing Sheets

(56) References Cited

U.S. PATENT DOCUMENTS

| 2019/0037173 A1* | 1/2019 | Lee | G06F 3/04842 |
| 2019/0110110 A1 | 4/2019 | Yoshiga | |
| 2022/0134226 A1* | 5/2022 | Takura | G06F 3/0488 |
| | | | 463/31 |

FOREIGN PATENT DOCUMENTS

| CN | 109803104 A | * | 5/2019 |
| CN | 110837406 A | | 2/2020 |
| CN | 113010073 A | | 6/2021 |
| JP | 2004133499 A | | 4/2004 |
| JP | 2018005893 A | | 1/2018 |

OTHER PUBLICATIONS

Xiao You Deng Ni, "Super Screenshot and Screen Recording Master: Operation and Use of Screen Recording," Youku Video, Oct. 19, 2018, available at <https://v.youku.com/v_show/id_XMzgINDc0ODJ3Ng%3D%3D>, with English translation (2 pages).
Anonymous, "How to Use Super Screenshot and Screen Recording Master: Super Screenshot and Screen Recording Master Tutorial," 973 Game, Nov. 6, 2020, available at <https://www.973.com/luping/232>, with English translation (8 pages).
First Office Action issued Mar. 11, 2022 in Chinese Application No. 202110461916.7, with English translation (14 pages).

\* cited by examiner

Figure 1:
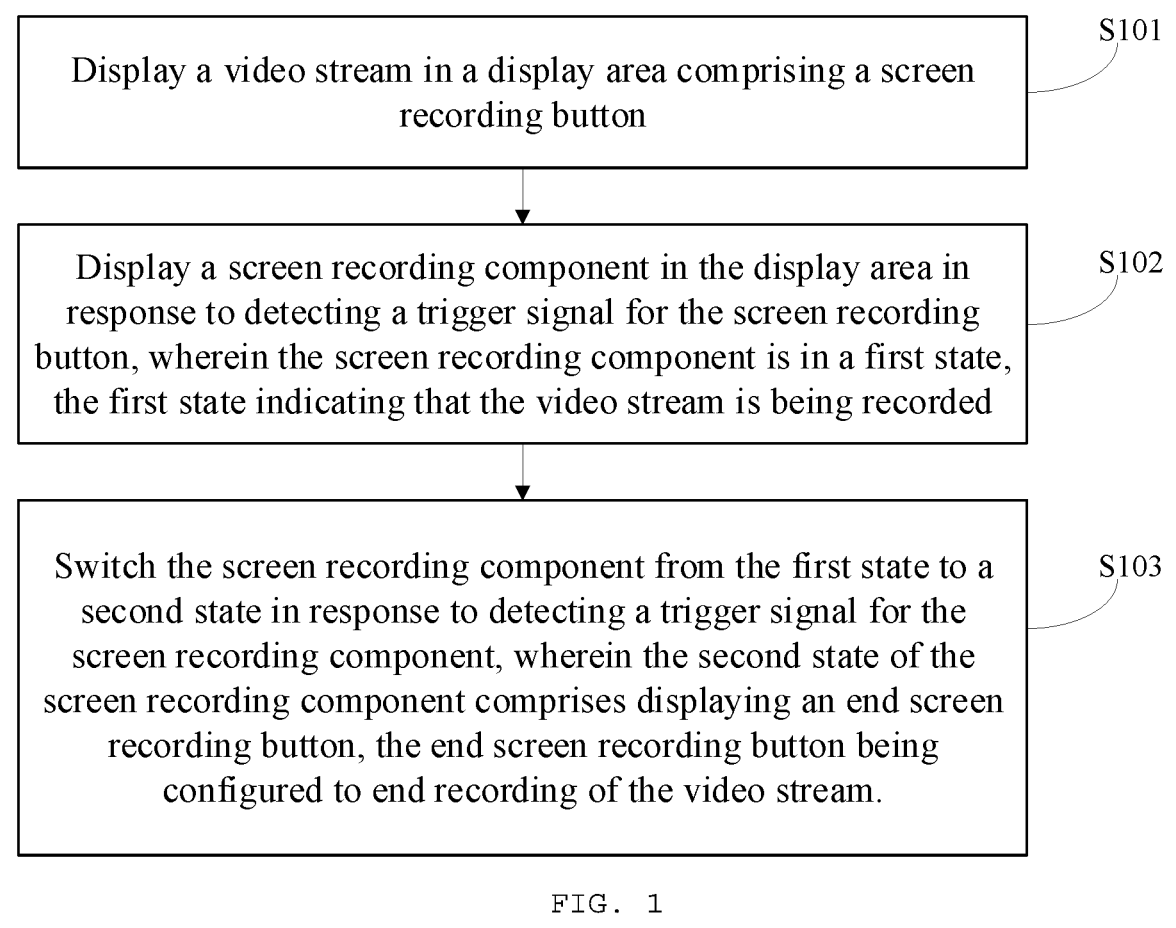

S101

Display a video stream in a display area comprising a screen recording button

S102

Display a screen recording component in the display area in response to detecting a trigger signal for the screen recording button, wherein the screen recording component is in a first state, the first state indicating that the video stream is being recorded

S103

Switch the screen recording component from the first state to a second state in response to detecting a trigger signal for the screen recording component, wherein the second state of the screen recording component comprises displaying an end screen recording button, the end screen recording button being configured to end recording of the video stream.

Recording success

Edit text    Save draft    Edit video    Publish

Share    XXXXX

SCREEN RECORDING INTERACTION METHOD AND APPARATUS, AND ELECTRONIC DEVICE AND COMPUTER-READABLE STORAGE MEDIUM

CROSS-REFERENCE TO RELATED APPLICATIONS

The present application is a U.S. National Stage Application under 35 U.S.C. § 371 of International Patent Application No. PCT/CN2022/081912, filed on Mar. 21, 2022, which claims priority to China Patent Application No. 202110461916.7 filed on Apr. 27, 2021, the disclosure of both of which are incorporated by reference herein in entirety.

TECHNICAL FIELD

The present disclosure relates to a screen recording inter-action method, an apparatus, an electronic device, and a computer-readable storage medium.

BACKGROUND

With the development of computer interaction technology and multimedia data processing technology, a user can browse various multimedia contents, such as live videos, by operating a terminal device.

SUMMARY

This summary is provided for a concise introduction of the concept of the present disclosure, which will be described in detail in the detailed description below. This summary is not intended to identify critical features or essential features of the claimed technical solution, nor is it intended to be used to limit the scope of the claimed technical solution.

In a first aspect, an embodiment of the present disclosure provides a screen recording interaction method, comprising: displaying a video stream in a display area comprising a screen recording button; displaying a screen recording com-ponent in the display area in response to detecting a trigger signal for the screen recording button, wherein the screen recording component is in a first state, the first state indi-cating that the video stream is being recorded; and switching the screen recording component from the first state to a second state in response to detecting a trigger signal for the screen recording component, wherein the second state of the screen recording component comprises displaying an end screen recording button, the end screen recording button being configured to end recording of the video stream.

In some embodiments, the method further comprises: displaying a recording success panel in response to detecting a trigger signal for the end screen recording button.

In some embodiments, the display area comprising the screen recording button comprises: the display area com-prising a function panel component; and displaying a func-tion panel in response to detecting a trigger signal for the function panel component, wherein the function panel com-prises the screen recording button.

In some embodiments, the screen recording component is displayed in a first area of the display area, wherein the first area does not conflict with another display area of the display area.

In some embodiments, the first state comprises a screen recording animation effect, the screen recording animation effect comprising a light point blinking animation effect and/or a recording time timing animation effect.

In some embodiments, the switching of the screen record-ing component from the first state to the second state comprises: expanding the screen recording component, wherein the screen recording component expanded com-prises the end screen recording button.

In some embodiments, the second state further comprises displaying a preset function button; and the method further comprises: performing an operation corresponding to the preset function button in response to detecting a trigger signal for the preset function button.

In some embodiments, the preset function button com-prises a clearing screen button; and the performing of the operation corresponding to the preset function button in response to detecting the trigger signal for the preset func-tion button comprises: making a recorded video be a clear-ing screen video or an non-clearing screen video in response to detecting a trigger signal for the clearing screen button.

In some embodiments, the displaying of the recording success panel in response to detecting the trigger signal for the end screen recording button comprises: making the screen recording component disappear from the display area in response to detecting the trigger signal for the end screen recording button; and displaying the recording success panel, the recording success panel comprising a processing component for a recorded video.

In some embodiments, the method further comprises: moving, in response to detecting a dragging signal for the screen recording component, the screen recording compo-nent to a display position determined by the dragging signal; and restoring the screen recording component to a default display position in response to detecting disappearance of the dragging signal.

In some embodiments, the method further comprises: switching the screen recording component from the second state to the first state after detecting the trigger signal for the preset function button.

In some embodiments, the method further comprises: after switching the screen recording component from the first state to the second state, switching the screen recording component from the second state to the first state in response to detecting a trigger signal for an area outside of the screen recording component.

In a second aspect, an embodiment of the present disclo-sure provides a screen recording interaction apparatus, com-prising: a video stream display module configured to display a video stream in a display area comprising a screen record-ing button; a screen recording component display module configured to display a screen recording component in the display area in response to detecting a trigger signal for the screen recording button, wherein the screen recording com-ponent is in a first state, the first state indicating that the video stream is being recorded; and a state switching module configured to switch the screen recording component from the first state to a second state in response to detecting a trigger signal for the screen recording component, wherein the second state of the screen recording component com-prises displaying an end screen recording button, the end screen recording button being configured to end recording of the video stream.

In some embodiments, the screen recording interaction apparatus further comprises: a recording success panel con-figured to display the recording success panel in response to detecting a trigger signal for the end screen recording button.

In some embodiments, the display area comprises a function panel component, and the screen recording interaction apparatus further comprises: a function panel component display module configured to display a function panel in response to detecting a trigger signal for the function panel component, wherein the function panel comprises the screen recording button.

In some embodiments, the screen recording component is displayed in a first area of the display area, wherein the first area does not conflict with another display area of the display area.

In some embodiments, the first state comprises a screen recording animation effect, the screen recording animation effect comprising a light point blinking animation effect and/or a recording time timing animation effect.

In some embodiments, the state switching module is further configured to expand the screen recording component, wherein the screen recording component expanded comprises the end screen recording button.

In some embodiments, the second state further comprises displaying a preset function button; and the screen recording interaction apparatus further comprises a preset function execution module configured to perform an operation corresponding to the preset function button in response to detecting a trigger signal for the preset function button.

In some embodiments, the preset function button comprises a clearing screen button; and the preset function execution module is further configured to make a recorded video be a clearing screen video or an non-clearing screen video in response to detecting a trigger signal for the clearing screen button.

In some embodiments, the recording success panel is further configured to make the screen recording component disappear from the display area in response to detecting the trigger signal for the end screen recording button, and display the recording success panel, the recording success panel comprising a processing component for a recorded video.

In some embodiments, the screen recording interaction apparatus further comprises: a dragging module configured to move, in response to detecting a dragging signal for the screen recording component, the screen recording component to a display position determined by the dragging signal, and restore the screen recording component to a default display position in response to detecting disappearance of the dragging signal.

In some embodiments, the state switching module is further configured to switch the screen recording component from the second state to the first state after detecting the trigger signal for the preset function button.

In some embodiments, the state switching module is further configured to, after switching the screen recording component from the first state to the second state, switch the screen recording component from the second state to the first state in response to detecting a trigger signal for an area outside of the screen recording component.

In a third aspect, an embodiment of the present disclosure provides an electronic device, comprising: a memory configured to store computer-readable instructions; and a processor configured to execute the computer-readable instructions, to cause the electronic device to implement the method according to any one of the first aspect.

In a fourth aspect, an embodiment of the present disclosure provides a non-transitory computer-readable storage medium configured to store computer-readable instructions that, when executed by a computer, cause the computer to implement the method according to any one of the first aspect.

In a fifth aspect, an embodiment of the present disclosure provides a computer program, comprising: instructions that, when executed by a processor, cause the processor to perform the method according to any one of the first aspect.

In a sixth aspect, an embodiment of the present disclosure provides a computer program product comprising instructions that, when executed by a processor, cause the processor to perform the method according to any one of the first aspect.

The above description is only an overview of the technical solution in the present disclosure. In order to understand the technical means of the present disclosure more clearly, which can be implemented in accordance with the content of the specification, and in order to make the above and other purposes, features, and advantages of the present disclosure more comprehensible, the following embodiments are specially cited as preferred embodiments and, together with the accompanying drawings, the detailed description is described below.

BRIEF DESCRIPTION OF THE DRAWINGS

The above and other features, advantages, and aspects of the embodiments of the present disclosure will become more apparent from the following embodiments with reference to the drawings. Throughout the drawings, the same or similar reference signs indicate the same or similar elements. It should be understood that the drawings are schematic and the components and elements are not necessarily drawn to scale.

FIG. 1 is a flowchart of the screen recording interaction method provided in an embodiment of the present disclosure;

FIGS. 2A to 2D are schematic diagrams of screen recording interaction interfaces provided in optional embodiments of the present disclosure;

DETAILED DESCRIPTION

Figure 2A:
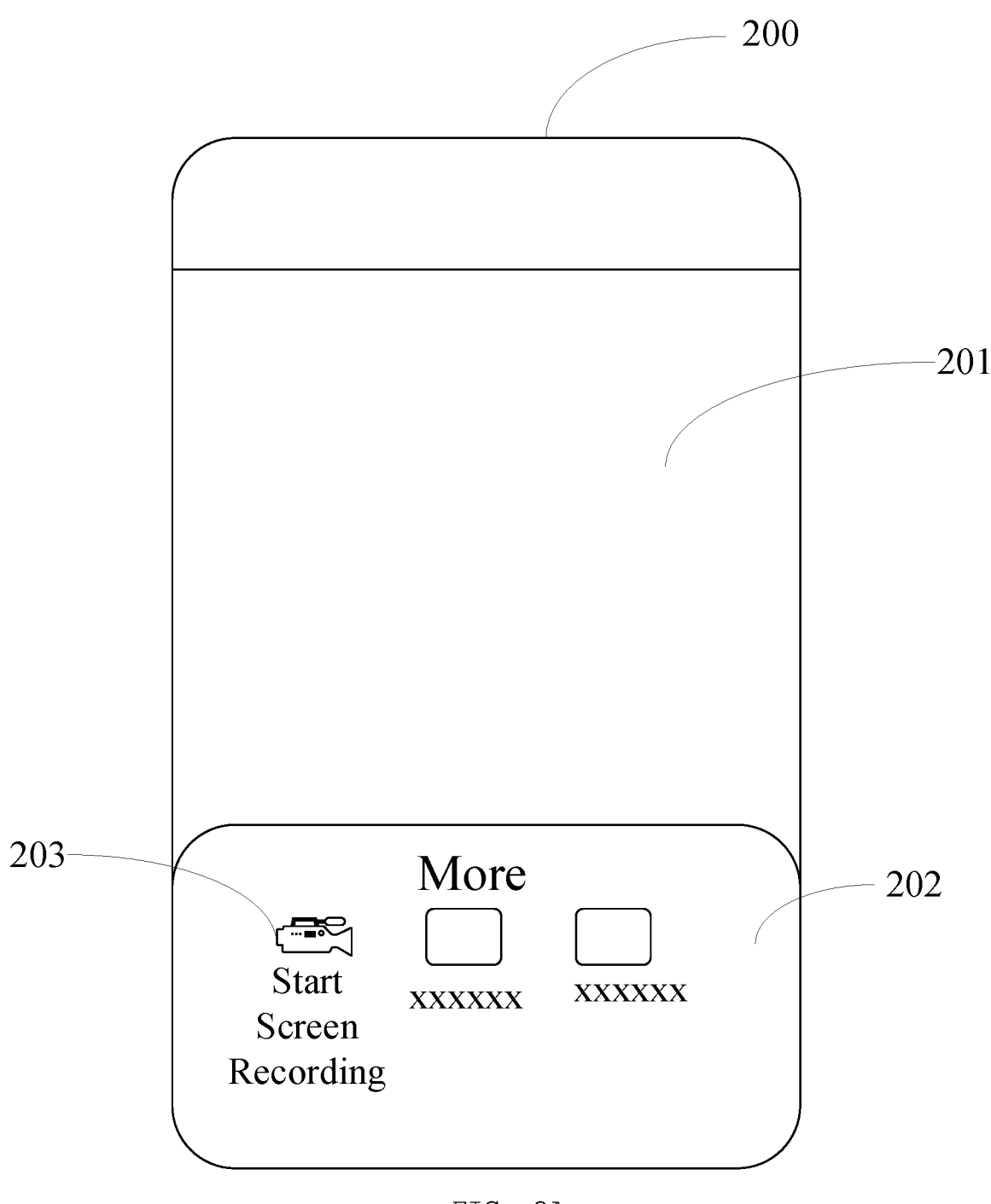

Exemplary embodiments of the present disclosure will be described in detail below with reference to the accompanying drawings. Although some embodiments of the present disclosure are shown in the accompanying drawings, it should be understood that the present disclosure can be implemented in various forms, and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, and are not used to limit the scope of protection of the present disclosure.

It should be understood that the various steps described in the methods of the embodiments of the present disclosure may be executed in a different order, and/or executed in parallel. In addition, the methods may comprise additional steps and/or some of the illustrated steps may be omitted. The scope of the present disclosure is not limited in this regard.

The term "comprising" and its variants as used herein is an open-ended mode expression, that is, "comprising but not limited to". The term "based on" means "based at least in part on". The term "one embodiment" means "at least one embodiment"; the term "another embodiment" means "at least one additional embodiment"; and the term "some embodiments" means "at least some embodiments". Related definitions of other terms will be given in the following description.

It should be noted that the concepts of "first" and "second" mentioned in the present disclosure are only used to distinguish different devices, modules or units, and are not used to limit the order of functions performed by these devices, modules or units, or interdependence therebetween.

It should be noted that the modifications of "a" and "a plurality of" mentioned in the present disclosure are illustrative and not restrictive, and those skilled in the art should understand that unless clearly indicated in the context, they should be understood as "one or more".

In related art, a media browsing application sometimes has a built-in live video recording function. However, the inventors of the present disclosure have found that the function often has various shortcomings, such as complex operating steps, other operation functions being blocked from operation when the function is operated, etc., which cause inconvenience to a user.

In view of this, an embodiment of the present disclosure provide a screen recording interaction method to make a screen recording operation more convenient.

FIG. 1 is a flowchart of the screen recording interaction method provided in an embodiment of the present disclosure. The screen recording interaction method provided by the embodiment may be performed by a screen recording interaction apparatus that is implemented as software or a combination of software and hardware. The screen recording interaction apparatus can be integrated in a certain device of a screen recording interaction system, such as a terminal device. As shown in FIG. 1, the method comprises steps S101 to S103.

In step S101, a video stream is displayed in a display area, wherein the display area comprises a screen recording button.

In step S101, a video stream is displayed in the display area of the terminal, wherein the display area is a display area of an application that plays the video stream, such as a display area of a live room in a livestream application, in which a live room video stream is displayed. In the display area of the video stream, there is also a screen recording button configured to activate a screen recording function to record the video stream and other content in the display area.

Optionally, the display area comprising the screen recording button may be that the screen recording button is displayed in the display area, or the screen recording button is set in another functional component within the display area.

Optionally, the display area comprising the screen recording button comprises: the display area comprising a function panel component; and displaying a function panel in response to detecting a trigger signal for the function panel component, wherein the function panel comprises the screen recording button.

The function panel component comprises buttons corresponding to a plurality of functions, and the function panel comprises the screen recording button. In a case where a trigger signal for the function panel is detected, for example, the function panel is in a hidden state by default, after the user clicks a display button of the function panel, the function panel is displayed; or, the function panel is in a display state by default and the screen recording button is in a hidden state in the function panel, when a "More" button on the function panel is clicked, the screen recording button is displayed.

In step S102, a screen recording component is displayed in the display area in response to detecting a trigger signal for the screen recording button, wherein the screen recording component is in a first state, the first state indicating that the video stream is being recorded.

Optionally, when a click signal or a start signal for the screen recording button is received, a screen recording component is displayed in the display area, wherein the screen recording component is in a first state to indicate that the video stream in the display area is being recorded. The recording of the video stream in the display area comprises recording all displayed contents in the display area, comprising the video itself, other contents displayed concurrently with the video stream during play of the video stream, such as a comment of a user, a bullet screen, an operation area of a user in the display area, and an operation of a user in the operation area in the livestream scenario.

Optionally, the screen recording component is displayed in a first area of the display area, wherein the first area does not conflict with another display area of the display area. As an example, the display area is divided into a first area, a second area, and a third area, wherein the first area does not display components other than the screen recording component; the second area is a display area of an operation component and is configured to display the function panel described above and another functional component; and the third area is an information display area and is configured to display information related to the video stream, etc. The first area does not conflict with other areas, which means that the screen recording component does not block the content and/or components displayed in other areas. In this way, key information in the recorded video cannot be blocked by the screen recording component, nor is it unable to perform another functional operation due to the blocking of the screen recording component during the recording process.

Optionally, the first state comprises a screen recording animation effect, the screen recording animation effect comprising a light point blinking animation effect and/or a recording time timing animation effect. For example, the light point blinking animation effect may comprise a circular red light point that blinks periodically to indicate that the content in the display area is being recorded as video, and/or the screen recording animation effect may also comprise a recording time timing animation effect that indicates, starting from the activation of the screen recording function, time displayed in real time that the screen recording function has been activated, i.e. a duration of the recorded video. This allows the user to visually check whether the screen recording function is activated.

Optionally, the screen recording component may also be dragged to flexibly change a display position of the screen recording component. Optionally, the method further comprises: moving, in response to detecting a dragging signal for the screen recording component, the screen recording component to a display position determined by the dragging signal; and restoring the screen recording component to a default display position in response to detecting disappearance of the dragging signal.

Optionally, the dragging signal can be generated by pressing and dragging performed by a user on the touch screen, or by a human-computer interaction device such as a mouse. The dragging signal comprises position information, wherein the position information is a display position of the screen recording component, and the screen recording component moves according to the display position. When the dragging signal disappears, the screen recording component can remain at the display position or be restored to its default display position for display. The default display position can be coordinates of the screen recording component in the display area, or may comprise only a coordinate on a single axis of the screen recording component in the display area, such as a Y-axis coordinate. For example, the default display position of the screen recording component is on a left or right boundary of the display area, such as the Y-axis coordinate of the left or right boundary, and does not exceed the range of the first area. After the user drags and releases the screen recording component, the display position of the screen recording component is automatically restored to fit snugly against the left or right boundary of the display area to achieve the effect of being sucked in at the boundary.

In step S103, the screen recording component is switched from the first state to a second state in response to detecting a trigger signal for the screen recording component, wherein the second state of the screen recording component comprises displaying an end screen recording button, the end screen recording button being configured to end recording of the video stream.

Optionally, the trigger signal for the screen recording component comprises a click signal for the screen recording component. When a click of the user on the screen recording component is detected, the screen recording component is switched from the first state to the second state. The second state comprises displaying an end screen recording button.

Optionally, the second state is an expanded state of the screen recording component. The switching of the screen recording component from the first state to the second state comprises: expanding the screen recording component, wherein the screen recording component expanded comprises the end screen recording button. As an example, the screen recording component may be a circular icon comprising a red blinking button. When the user clicks on the screen recording component, the screen recording component is expanded into an oval icon wherein the end screen recording button is displayed at one end of the oval icon.

Optionally, the second state further comprises displaying a preset function button. That is, after the screen recording component is expanded, the screen recording component expanded can further comprise other more preset function buttons. Thus, more functions related to operations in the screen recording process can be provided via a screen recording component. In this case, the method further comprises: performing an operation corresponding to the preset function button in response to detecting a trigger signal for the preset function button. Optionally, when a preset function button is clicked, the terminal or application performing the screen recording interaction method performs an operation corresponding to the preset function button.

As an example, the preset function button comprises a clearing screen button; and the performing of the operation corresponding to the preset function button in response to detecting the trigger signal for the preset function button comprises: making a recorded video be a clearing screen video or an non-clearing screen video in response to detecting a trigger signal for the clearing screen button. The clearing screen button is configured to clear display content in the display area other than the video stream and the screen recording component, and is further configured to restore hidden display content in the display area. That is, the clearing screen button switches between the functions of clearing the screen and restoring the display after receiving a trigger signal. Optionally, the clearing screen button also have two states: a clearing screen state and a display state. After receiving a trigger signal, the clearing screen button switches between the clearing screen state and the display state. For example, the clearing screen button is provided with a clearing screen icon. When the clearing screen button is in the clearing screen state, the clearing screen icon is highlighted. When the clearing screen button is in the display state, the clearing screen icon is gray. Alternatively, the clearing screen button is in the form of a switch. When the switch is in an on state, the display area is in a clearing screen state. When the switch is in an off state, the display area is in a non-clearing screen state.

Optionally, the method further comprises: switching the screen recording component from the second state to the first state after detecting the trigger signal for the preset function button. For example, after the preset function button is clicked, the screen recording component is switched from an expanded state back to a screen recording prompt state or a screen recording timing state. That is, after only the function of the preset function button is triggered, the screen recording operation will not stop, so the screen recording component will be switched to the first state which continues to indicate that the video stream is being recorded.

Optionally, the method further comprises: after switching the screen recording component from the first state to the second state, switching the screen recording component from the second state to the first state in response to detecting a trigger signal for an area outside of the screen recording component.

The above optional embodiment corresponds to a situation where no trigger signal is received for a button on the screen recording component after the screen recording component is switched to the second state. That is, after the user clicks the screen recording component to make the screen recording component be expanded to display more functional buttons, the user does not click on these functional buttons, but instead clicks on an area outside of the screen recording component, the screen recording component is switched from the expanded state back to an original state, continuing to indicate that the video stream is being recorded.

In some embodiments, the method further comprises: displaying a recording success panel in response to detecting a trigger signal for the end screen recording button.

The recording success panel comprises a component corresponding to a function that can be performed after successful recording, so that the user can instruct the terminal to perform a subsequent operation after successful video recording.

Optionally, the displaying of the recording success panel in response to detecting the trigger signal for the end screen recording button comprises: making the screen recording component disappear from the display area in response to detecting the trigger signal for the end screen recording button; and displaying the recording success panel, the recording success panel comprising a processing component for a recorded video. The screen recording component is configured to record a video of the displayed content on the screen. When a trigger signal for the screen recording button is detected, it indicates that the recording ends. At this point, the screen recording component is made to disappear from the display area, and the recording success panel is displayed, the recording success panel comprising a processing component for a recorded video. As an example, the processing component for the video comprise, but are not limited to, one or more of a video text editing component, a video publishing component, a draft saving component, a video editing component, or a video sharing component.

When a trigger signal for the video text editing component is detected, an input box is displayed to receive text input by the user to provide a textual explanation for the video; when a trigger signal for the video publishing component is detected, the recorded video is published, for example, to a preset platform; when a trigger signal for the draft saving component is detected, the recorded video is saved as a draft for further processing; and when a trigger signal for the video editing component is detected, a video editing process is entered, in which operations such as editing, captioning, and adding special effects are performed on the recorded video to generate a final screen recording video. When a trigger signal for the video sharing component is detected, a group for sharing the video is displayed. The group is composed of one or more users, and when one or more users are selected, the displayed video is sent to the terminals or clients of the one or more users in the group.

Optionally, after detecting a trigger signal for the processing component of the recorded video, if no further operations are performed on the recorded video after that processing component is triggered, the recording success panel is made to disappear from the display area. For example, after the video publishing component or the draft saving component is triggered, the recorded video is directly published or saved. If there are no other operations, the recording success panel can be hidden to indicate the end of the entire screen recording interaction process. For example, after the video publishing component or the draft saving component is triggered, a prompt message can be displayed, and then the recording success panel is made to disappear, e.g., after the display of "published successfully" or "saved successfully" can be displayed, the recording success panel is made to disappear. It can be understood that after any other component on the recording success panel is triggered and a subsequent process is completed, the recording success panel may be made to disappear to indicate the end of the complete screen recording interaction process. It can be understood that the complete screen recording interaction process is only used to represent the entire process of recording a video stream, and does not limit the completeness of the solution of the present disclosure. The screen recording interaction method in the present disclosure may be a screen recording interaction method for any segment of the screen recording process, which will not be repeated herein.

In addition to the way of making the recording success panel disappear described above, the recording success panel may also be made to disappear in response to detecting a trigger signal for an empty display area outside the recording success panel. The empty display area represents a display area without an operation function, that is, there is no component with an operation function in the display area, so that it can achieve the effect of hiding the screen recording success panel after detecting a trigger signal in the area outside the recording success panel.

Figure 2B:
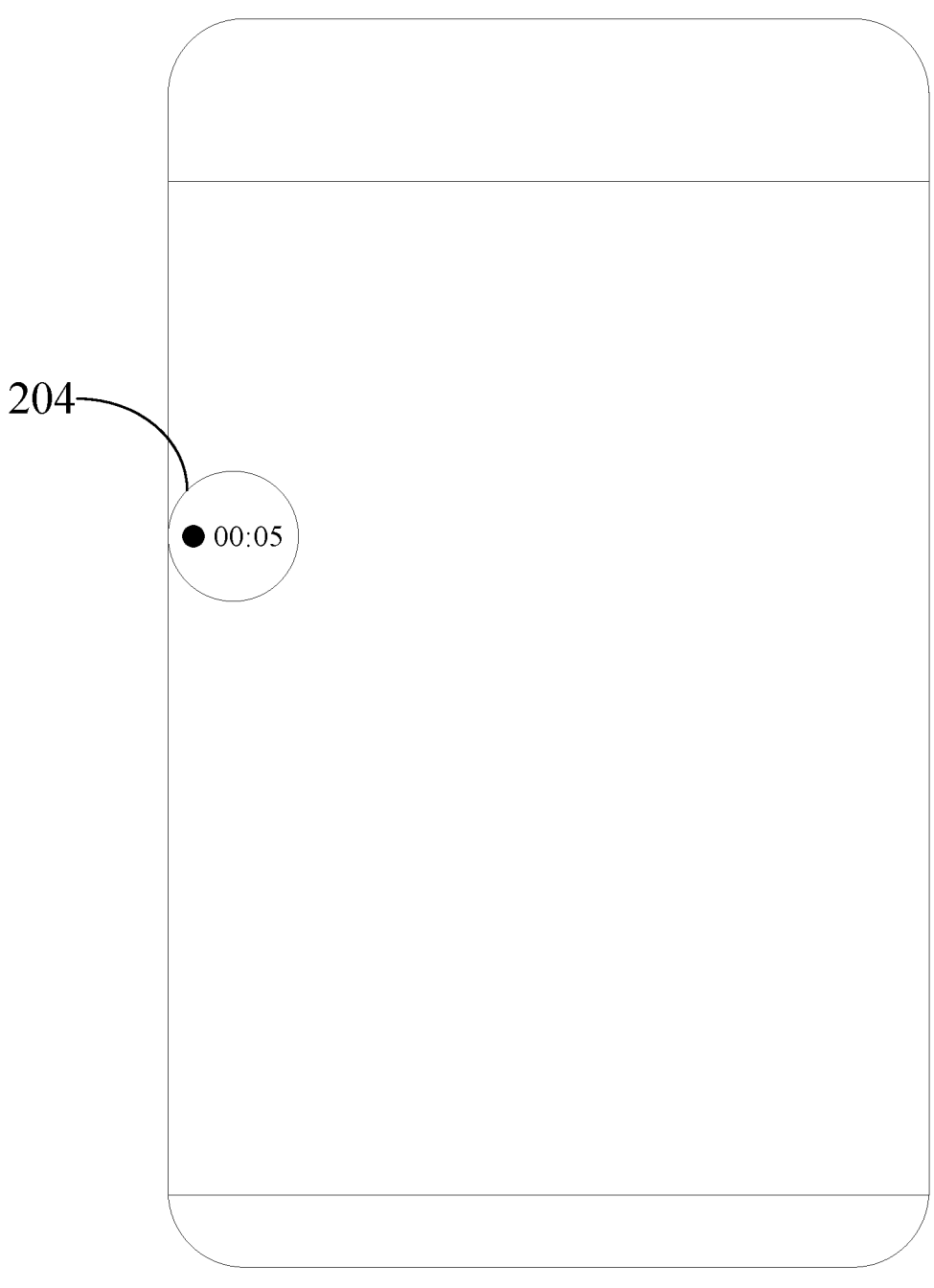
Figure 2C:
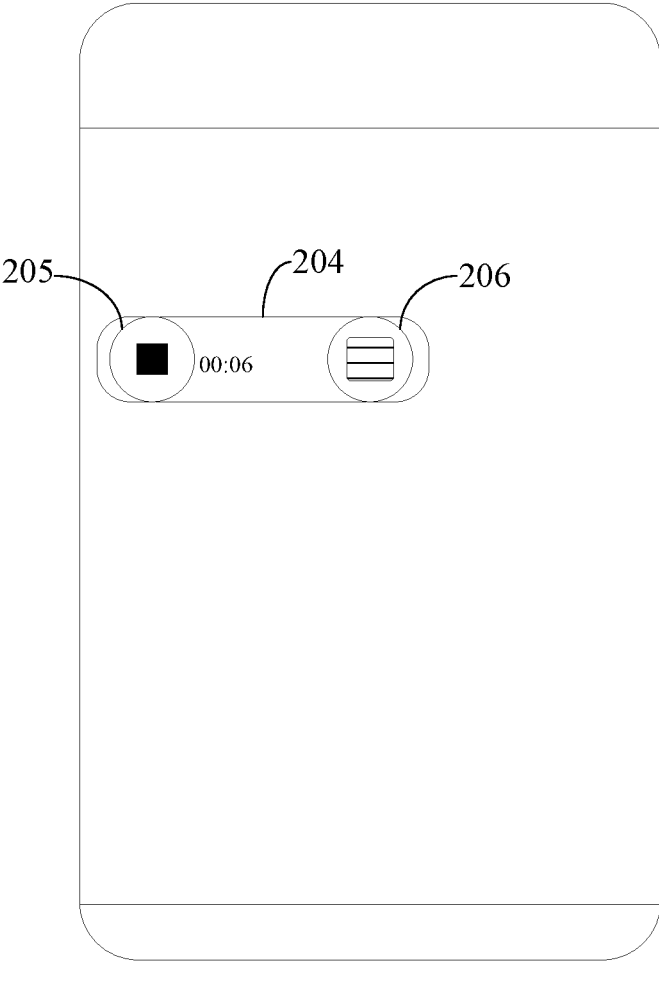
Figure 2D:
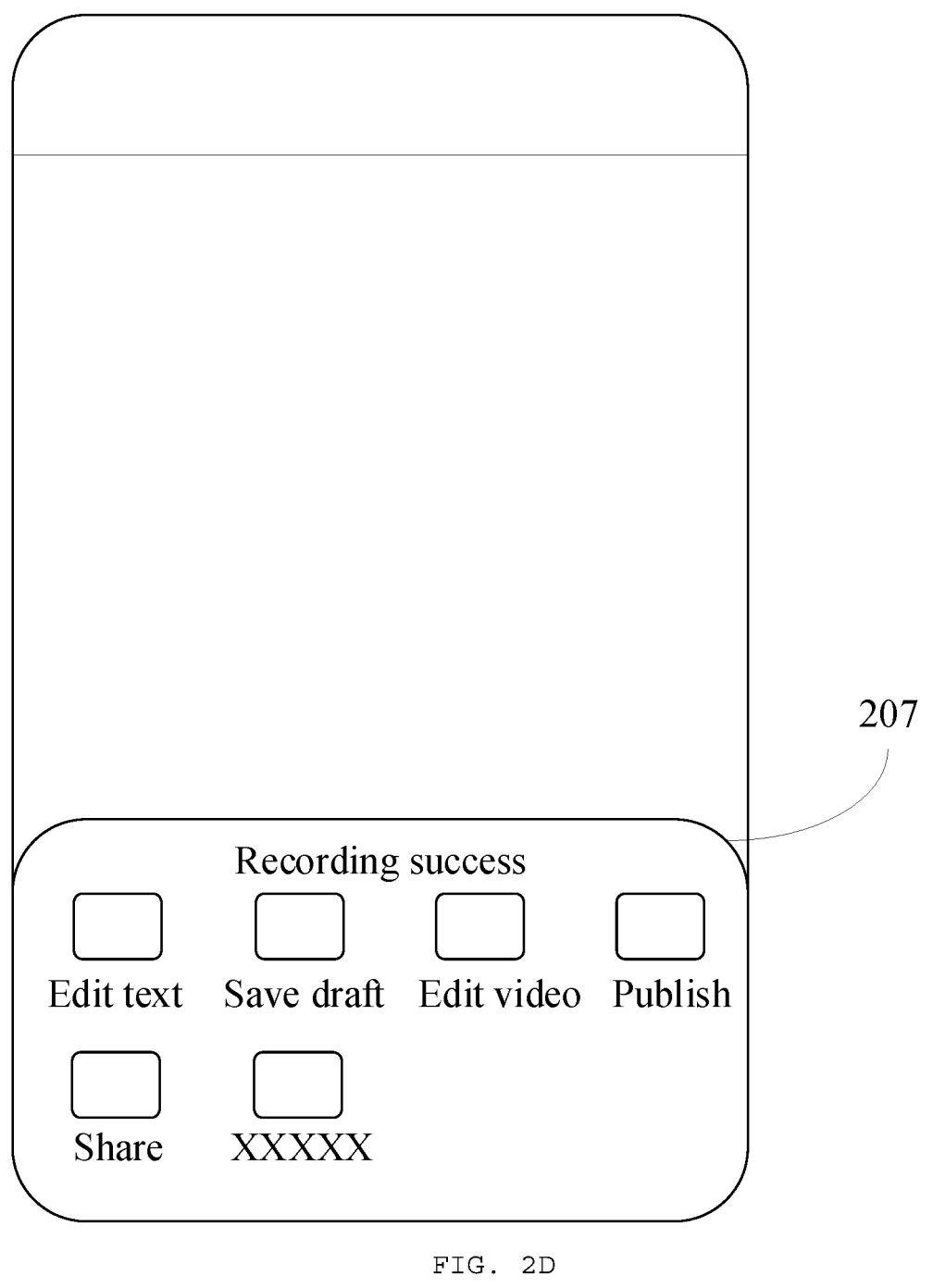

FIGS. 2A to 2D are schematic diagrams of screen recording interaction interfaces provided in an optional embodiment of the present disclosure. In the optional embodiment, an interface 200 of a video application comprises a display area 201, wherein a video stream is displayed in the display area. The display area 201 also comprises at least one functional component, one of which is configured to display a functional button panel 202. When the user clicks on the functional component, the functional button panel 202 appears, on which a start screen recording button 203 is displayed. When the user clicks the start screen recording button 203, the functional button panel disappears and the screen recording component 204 in the first state is displayed in the display area, as shown in FIG. 2B. The first state comprises the display of a blinking light point and a recording time timing animation effect on the screen recording component to indicate that the content displayed in the display area is currently being recorded. When the user clicks on the screen recording component 204, the screen recording component 204 is switched to the second state, as shown in FIG. 2C. The second state is an expanded state of the screen recording component, wherein the expanded state comprises the display of an end screen recording button 205 and a clearing screen button 206. When the user clicks the clearing screen button 206, the display area can be in a clearing screen state or switched from the clearing screen state to an non-clearing screen state, and the corresponding recorded video may be a clearing screen video or an non-clearing screen video. When the user clicks the end screen recording button 205, the screen recording component disappears. A recording success panel 207 is displayed in the display area, wherein the recording success panel comprises functional components related to video processing after recording, such as text editing, saving drafts, video editing, publishing, sharing, etc., so that the user can click the functional components and use functions corresponding to the functional components.

By the screen recording interaction method in the above embodiment, the user can operate and control the screen recording process using several buttons, making the operation more convenient; in addition, because another function button can be set on the screen recording component, another function can be used during the screen recording process, making the operation more convenient for the user.

An embodiment of the present disclosure provides a screen recording interaction method, comprising: displaying a video stream in a display area comprising a screen recording button; displaying a screen recording component in the display area in response to detecting a trigger signal for the screen recording button, wherein the screen recording component is in a first state, the first state indicating that the video stream is being recorded; and switching the screen recording component from the first state to a second state in response to detecting a trigger signal for the screen recording component, wherein the second state of the screen recording component comprises displaying an end screen recording button, the end screen recording button being configured to end recording of the video stream. By the screen recording component in the above method, it can make the screen recording operation more convenient and provide more interactive functions.

Figure 3:
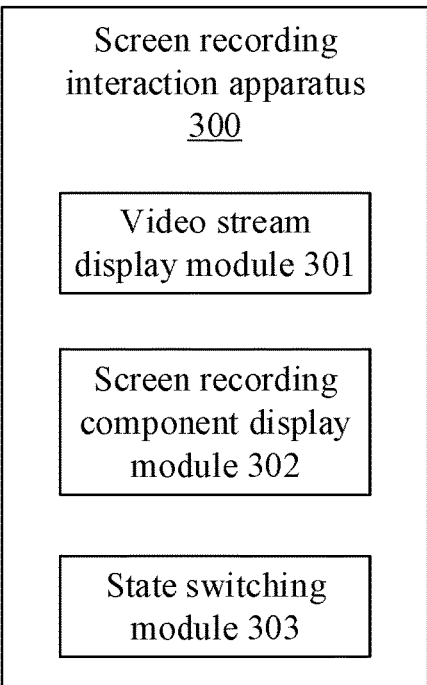
FIG. 3 is a schematic structural diagram of a screen recording interaction apparatus provided by an embodiment of the present disclosure.

FIG. 3 is a schematic structural diagram of a screen recording interaction apparatus provided by an embodiment of the present disclosure. As shown in FIG. 3, the apparatus 300 comprises: a video stream display module 301, a screen recording component display module 302, and a state switching module 303.

The video stream display module 301 is configured to display a video stream in a display area, wherein the display area comprises a screen recording button.

The screen recording component display module 302 is configured to display a screen recording component in the display area in response to detecting a trigger signal for the screen recording button, wherein the screen recording component is in a first state, the first state indicating that the video stream is being recorded.

The state switching module 303 is configured to switch the screen recording component from the first state to a second state in response to detecting a trigger signal for the screen recording component, wherein the second state of the screen recording component comprises displaying an end screen recording button, the end screen recording button being configured to end recording of the video stream.

In some embodiments, the screen recording interaction apparatus 300 further comprises: a recording success panel configured to display the recording success panel in response to detecting a trigger signal for the end screen recording button.

In some embodiments, the display area comprises a function panel component, and the screen recording interaction apparatus 300 further comprises: a function panel component display module configured to display a function panel in response to detecting a trigger signal for the function panel component, wherein the function panel comprises the screen recording button.

In some embodiments, the screen recording component is displayed in a first area of the display area, wherein the first area does not conflict with another display area of the display area.

In some embodiments, the first state comprises a screen recording animation effect, the screen recording animation effect comprising a light point blinking animation effect and/or a recording time timing animation effect.

In some embodiments, the state switching module 303 is further configured to expand the screen recording component, wherein the screen recording component expanded comprises the end screen recording button.

In some embodiments, the second state further comprises displaying a preset function button; and the screen recording interaction apparatus further comprises a preset function execution module configured to perform an operation corresponding to the preset function button in response to detecting a trigger signal for the preset function button.

In some embodiments, the preset function button comprises a clearing screen button; and the preset function execution module is further configured to make a recorded video be a clearing screen video or an non-clearing screen video in response to detecting a trigger signal for the clearing screen button.

In some embodiments, the recording success panel is further configured to make the screen recording component disappear from the display area in response to detecting the trigger signal for the end screen recording button, and display the recording success panel, the recording success panel comprising a processing component for a recorded video.

In some embodiments, the screen recording interaction apparatus 300 further comprises: a dragging module configured to move, in response to detecting a dragging signal for the screen recording component, the screen recording component to a display position determined by the dragging signal, and restore the screen recording component to a default display position in response to detecting disappearance of the dragging signal.

In some embodiments, the state switching module 303 is further configured to switch the screen recording component from the second state to the first state after detecting the trigger signal for the preset function button.

In some embodiments, the state switching module 303 is further configured to, after switching the screen recording component from the first state to the second state, switch the screen recording component from the second state to the first state in response to detecting a trigger signal for an area outside of the screen recording component.

The apparatus shown in FIG. 3 may execute the method of the embodiment shown in FIG. 1. For the parts not described in detail in the embodiment, reference may be made to the related description of the embodiment shown in FIG. 1. For the execution process and technical effects of the technical solution, reference may be made to the description of the embodiment shown in FIG. 1, which will not be repeated herein.

Figure 4:
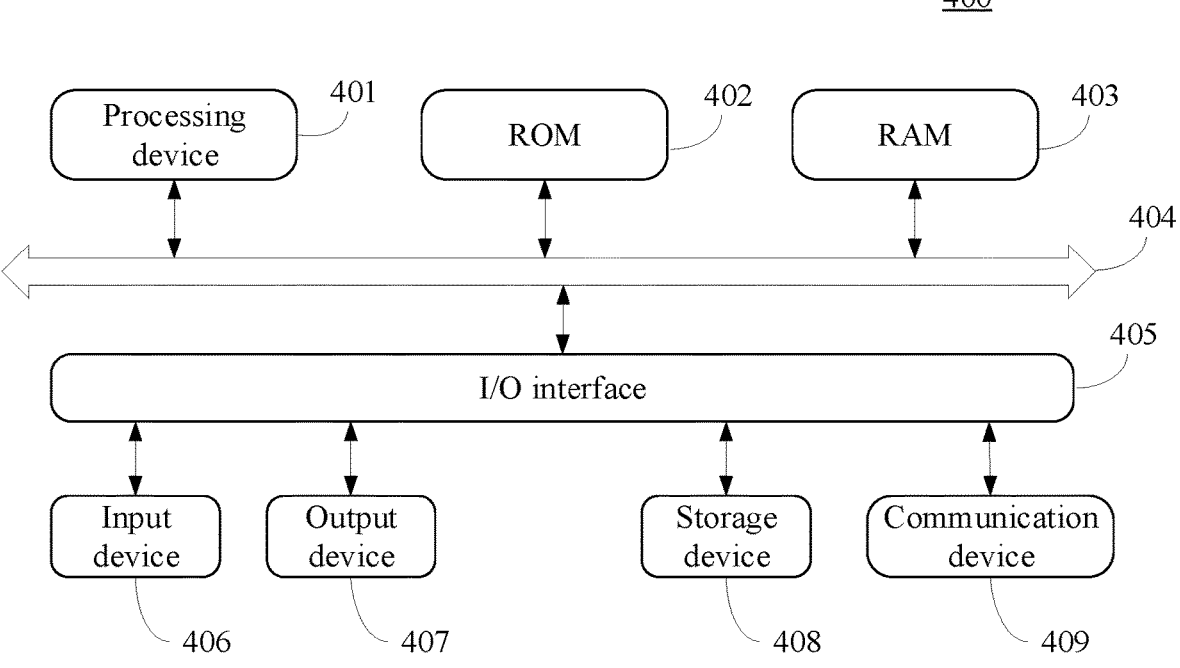
FIG. 4 is a schematic structural diagram of an electronic device provided by an embodiment of the present disclosure.

Referring now to FIG. 4, a structural diagram of an electronic device 400 suitable for implementing the embodiments of the present disclosure is shown. The terminal device of the embodiment of the present disclosure may comprise, but not limited to, a mobile terminal such as a mobile phone, a notebook computer, a digital broadcast receiver, a PDA (Personal Digital Assistant), a PAD (tablet computer), a PMP (Portable Multimedia Player), an on-board terminal (such as an on-board navigation terminal), and a fixed terminal such as a digital TV, a desktop computer, or the like. The electronic device shown in FIG. 4 is merely an example and should not impose any limitation on the function and scope of the embodiment of the present disclosure.

As shown in FIG. 4, the electronic device 400 may comprise a processing device (e.g., a central processing unit, a graphics processor) 401, which may perform various appropriate actions and processes according to a program stored in Read Only Memory (ROM) 402 or a program loaded from a storage device 408 into Random Access Memory (RAM) 403. In RAM 403, various programs and data required for the operation of the electronic device 400 are also stored. Processing device 401, ROM 402 and RAM 403 are connected to each other through a communication line 404. Input/Output (I/O) interface 405 is also connected to the communication line 404.

Generally, the following devices can be connected to I/O interface 405: an input device 406 comprising, for example, a touch screen, a touch pad, a keyboard, a mouse, a camera, a microphone, an accelerometer, a gyroscope, etc.; an output device 407 comprising, for example, a liquid crystal display (LCD), a speaker, a vibrator, etc.; a storage device 408 comprising, for example, a magnetic tape, a hard disk, etc.; and a communication device 409. The communication device 409 enables the electronic device 400 to communicate wirelessly or wiredly with other devices to exchange data. Although FIG. 4 shows the electronic device 400 with various components, it should be understood that it is not required to implement or have all of these components. Alternatively, more or fewer components can be implemented or provided.

In particular, according to an embodiment of the present disclosure, the processes described above with reference to the flowchart can be implemented as a computer software program. For example, an embodiment of the present disclosure comprises a computer program product, which comprises a computer program carried on a non-transitory computer readable medium, and containing program code for executing the method shown in the flowchart. In such an embodiment, the computer program may be downloaded and installed from the network through the communication device 409, or installed from the storage device 408, or from the ROM 402. When the computer program is executed by the processing device 401, the above functions defined in the method of the embodiment of the present disclosure are performed.

It should be noted that the computer-readable medium in the present disclosure may be a computer-readable signal medium or a computer-readable storage medium, or any combination of thereof. The computer readable storage medium can be, for example, but not limited to, an electronic, magnetic, optical, electromagnetic, infrared, or semiconductor system, apparatus, or device, or any combination of the above. More specific examples of the computer readable storage medium may comprise, but are not limited to: electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing. In the present disclosure, a computer readable storage medium can be any tangible medium that can contain or store a program, wherein the program can be used by or in connection with an instruction execution system, apparatus or device. In the present disclosure, a computer readable signal medium may comprise a data signal that is propagated in a baseband or as part of a carrier, carrying computer readable program code. Such propagated data signals can take a variety of forms comprising, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium can be transmitted by any suitable medium, comprising but not limited to wire, fiber optic cable, RF (radio frequency), etc., or any suitable combination of the foregoing.

In some embodiments, a client and a server can communicate using any currently known or future developed network protocol such as HTTP (HyperText Transfer Protocol), and can be interconnected by any form or medium of digital data communication, e.g., a communication network. Examples of communication networks comprise a local area network ("LAN") and a wide area network ("WAN"), the Internet, and end-to-end networks (for example, ad hoc end-to-end networks), as well as any currently known or future developed networks.

The above computer-readable medium may be comprised in the electronic device described above; or it may exist alone without being assembled into the electronic device.

The computer-readable medium carries one or more programs that, when executed by the electronic device, cause the electronic device to: implement the screen recording interaction method of the above embodiment.

The computer program code for executing operations of the present disclosure may be written in one or more program design languages or combinations thereof, the program design languages comprising, but not limited to, object-oriented program design languages, such as Java, Smalltalk, C++, etc., as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the circumstance involving the remote computer, the remote computer may be connected to the user computer through any kind of network, comprising local area network (LAN) or wide area network (WAN), or connected to an external computer (for example using an internet service provider via Internet).

The flowcharts and block diagrams in the accompanying drawings illustrate the architecture, functionality, and operation of some possible implementations of apparatus, methods and computer program products in accordance with various embodiments of the present disclosure. In this regard, each block in the flowchart or block diagrams may represent a module, program segment, or portion of code, wherein the module, program segment, or portion of code comprises one or more executable instructions for implementing a specified logical function. It should also be noted that, in some alternative implementations, the functions noted in the block may occur out of the order noted in the accompanying drawings. For example, two blocks shown in succession may be executed substantially in parallel, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or operations, or combinations of special purpose hardware and computer instructions.

The units involved in the embodiments described in the present disclosure can be implemented in software or hardware. Names of the units do not constitute a limitation on the units themselves under certain circumstances.

The functions described above may be performed at least in part by one or more hardware logic components. For example, without limitation, exemplary types of hardware logic components that can be used comprise: Field Programmable Gate Array (FPGA), Application Specific Integrated Circuit (ASIC), Application Specific Standard Product (ASSP), System on Chip (SOC), Complex Programmable Logic Device (CPLD), etc.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combination of thereof. More specific examples of the machine-readable storage medium may comprise electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing.

According to one or more embodiments of the present disclosure, an electronic device is provided, comprising: at least one processor; and a memory communicatively coupled to the at least one processor; wherein the memory stores instructions executable by the at least one processor, the instructions when executed by the at least one processor causing the at least one processor to perform any of the screen recording interaction methods in the first aspect.

According to one or more embodiments of the present disclosure, a non-transitory computer-readable storage medium is provided, wherein the non-transitory computer-readable storage medium stores computer instructions used to cause a computer to execute any of the screen recording interaction methods in the first aspect.

According to one or more embodiments of the present disclosure, a computer program is provided, comprising: instructions that, when executed by a processor, cause the processor to perform any of the screen recording interaction methods described above.

According to one or more embodiments of the present disclosure, a computer program product is provided, comprising instructions that, when executed by a processor, cause the processor to perform any of the screen recording interaction methods described above.

The above description is only preferred embodiments of the present disclosure and an explanation of the applied technical principles. Those skilled in the art should understand that the scope of disclosure involved in the present disclosure is not limited to the technical solutions formed by the specific combination of the above technical features, and should also cover other technical solutions formed by any combination of the above technical features or their equivalent features without departing from the disclosed concept, for example, technical solutions formed by replacing the above features with technical features having similar functions to (but not limited to) those disclosed in the present disclosure.

What is claimed is:

1. A screen recording interaction method, comprising:

displaying a video stream in a display area comprising a screen recording button;

detecting a trigger signal for the screen recording button;

displaying a screen recording component in the display area in response to detecting the trigger signal for the screen recording button, wherein the screen recording component is in a first state, the first state indicating that the video stream is being recorded;

detecting a trigger signal for the screen recording component; and switching the screen recording component from the first state to a second state in response to detecting the trigger signal for the screen recording component, wherein the second state of the screen recording component comprises displaying an end screen recording button, the end screen recording button being configured to end recording of the video stream, wherein the second state further comprises displaying a preset function button, and the method further comprises:

detecting a trigger signal for the preset function button; and performing an operation corresponding to the preset function button in response to detecting the trigger signal for the preset function button, wherein the preset function button comprises a clearing screen button, and the performing of the operation corresponding to the preset function button in response to detecting the trigger signal for the preset function button comprises:

detecting a trigger signal for the clearing screen button; and making a recorded video be a clearing screen video or a non-clearing screen video in response to detecting the trigger signal for the clearing screen button, wherein the clearing screen button switches between functions of clearing a screen and restoring display after receiving the trigger signal for the clearing screen button.

2. The screen recording interaction method according to claim 1, further comprising:

detecting a trigger signal for the end screen recording button; and displaying a recording success panel in response to detecting the trigger signal for the end screen recording button.

3. The screen recording interaction method according to claim 2, wherein the displaying of the recording success panel in response to detecting the trigger signal for the end screen recording button comprises:

making the screen recording component disappear from the display area in response to detecting the trigger signal for the end screen recording button; and displaying the recording success panel, the recording success panel comprising a processing component for a recorded video.

4. The screen recording interaction method according to claim 1, wherein the display area comprising the screen recording button comprises:

the display area comprising a function panel component;

detecting a trigger signal for the function panel component; and displaying a function panel in response to detecting the trigger signal for the function panel component, wherein the function panel comprises the screen recording button.

5. The screen recording interaction method according to claim 1, wherein the screen recording component is displayed in a first area of the display area, wherein the first area does not conflict with another display area of the display area.

6. The screen recording interaction method according to claim 1, wherein the first state comprises a screen recording animation effect, the screen recording animation effect comprising a light point blinking animation effect and/or a recording time timing animation effect.

7. The screen recording interaction method according to claim 1, wherein the switching of the screen recording component from the first state to the second state comprises:

expanding the screen recording component, wherein the screen recording component expanded comprises the end screen recording button.

8. The screen recording interaction method according to claim 1, further comprising:

detecting a dragging signal for the screen recording component;

moving, in response to detecting the dragging signal for the screen recording component, the screen recording component to a display position determined by the dragging signal;

detecting disappearance of the dragging signal; and restoring the screen recording component to a default display position in response to detecting the disappearance of the dragging signal.

9. The screen recording interaction method according to claim 1, further comprising: switching the screen recording component from the second state to the first state after detecting the trigger signal for the preset function button.

10. The screen recording interaction method according to claim 1, further comprising:

after switching the screen recording component from the first state to the second state, detecting a trigger signal for an area outside of the screen recording component; and switching the screen recording component from the second state to the first state in response to detecting the trigger signal for the area outside of the screen recording component.

11. An electronic device, comprising:

a memory storing computer-readable instructions; and a processor configured to execute the computer-readable instructions, to cause the electronic device to:

display a video stream in a display area comprising a screen recording button;

detect a trigger signal for the screen recording button;

display a screen recording component in the display area in response to detecting the trigger signal for the screen recording button, wherein the screen recording component is in a first state, the first state indicating that the video stream is being recorded;

detect a trigger signal for the screen recording component; and switch the screen recording component from the first state to a second state in response to detecting the trigger signal for the screen recording component, wherein the second state of the screen recording component comprises displaying an end screen recording button, the end screen recording button being configured to end recording of the video stream, wherein the second state further comprises displaying a preset function button, and the processor is further configured to execute the computer-readable instructions, to cause the electronic device to:

detect a trigger signal for the preset function button; and perform an operation corresponding to the preset function button in response to detecting the trigger signal for the preset function button, wherein the preset function button comprises a clearing screen button, and the processor is further configured to execute the computer-readable instructions, to cause the electronic device to:

detect a trigger signal for the clearing screen button; and make a recorded video be a clearing screen video or a non-clearing screen video in response to detecting the trigger signal for the clearing screen button, wherein the clearing screen button switches between functions of clearing a screen and restoring display after receiving the trigger signal for the clearing screen button.

12. The electronic device according to claim 11, wherein the processor is further configured to execute the computer-readable instructions, to cause the electronic device to detect a trigger signal for the end screen recording button, and display a recording success panel in response to detecting the trigger signal for the end screen recording button.

13. The electronic device according to claim 11, wherein:

the display area comprises a function panel component; and the processor is configured to execute the computer-readable instructions, to cause the electronic device to detect a trigger signal for the function panel component, and display a function panel in response to detecting the trigger signal for the function panel component, wherein the function panel comprises the screen recording button.

14. The electronic device according to claim 11, wherein the screen recording component is displayed in a first area of the display area, wherein the first area does not conflict with another display area of the display area.

15. A non-transitory computer-readable storage medium storing computer-readable instructions that, when executed by a computer, cause the computer to:

display a video stream in a display area comprising a screen recording button;

detect a trigger signal for the screen recording button;

display a screen recording component in the display area in response to detecting the trigger signal for the screen recording button, wherein the screen recording component is in a first state, the first state indicating that the video stream is being recorded;

detect a trigger signal for the screen recording component; and switch the screen recording component from the first state to a second state in response to detecting the trigger signal for the screen recording component, wherein the second state of the screen recording component comprises displaying an end screen recording button, the end screen recording button being configured to end recording of the video stream;

wherein the second state further comprises displaying a preset function button; and the computer-readable instructions, when executed by the computer, further cause the computer to:

detect a trigger signal for the preset function button; and perform an operation corresponding to the preset function button in response to detecting the trigger signal for the preset function button;

wherein the preset function button comprises a clearing screen button; and the computer-readable instructions, when executed by the computer, further cause the computer to:

detect a trigger signal for the clearing screen button; and make a recorded video be a clearing screen video or a non-clearing screen video in response to detecting the trigger signal for the clearing screen button, wherein the clearing screen button switches between functions of clearing a screen and restoring display after receiving the trigger signal for the clearing screen button.

16. The non-transitory computer-readable storage medium according to claim 15, wherein the computer-readable instructions that, when executed by the computer, further cause the computer to detect a trigger signal for the end screen recording button, and display a recording success panel in response to detecting the trigger signal for the end screen recording button.

17. The non-transitory computer-readable storage medium according to claim 15, wherein:

the display area comprises a function panel component; and the computer-readable instructions that, when executed by the computer, cause the computer to detect a trigger signal for the function panel component, and display a function panel in response to detecting the trigger signal for the function panel component, wherein the function panel comprises the screen recording button.

18. The non-transitory computer-readable storage medium according to claim 15, wherein the screen recording component is displayed in a first area of the display area, wherein the first area does not conflict with another display area of the display area.

* * * * *